United States Patent [19]
Chen et al.

[11] Patent Number: 6,101,278
[45] Date of Patent: Aug. 8, 2000

[54] SYSTEM FOR EXTRACTING CODING PARAMETERS FROM VIDEO DATA

[75] Inventors: Yingwei Chen, Ossining, N.Y.; Kiran Challapali, Stamford, Conn.; Mahesh Balakrishnan, Briarcliff Manor, N.Y.

[73] Assignee: Philips Electronics North America Corp., New York, N.Y.

[21] Appl. No.: 09/016,038

[22] Filed: Jan. 30, 1998

[51] Int. Cl.[7] .................................. G06K 9/36; H04N 7/12
[52] U.S. Cl. .......................... 382/239; 382/251; 348/405
[58] Field of Search ..................................... 382/232, 278, 382/168, 172, 228, 250, 251, 239; 348/405, 419, 420, 701

[56] References Cited

U.S. PATENT DOCUMENTS

| | | | |
|---|---|---|---|
| 5,072,290 | 12/1991 | Yamagami et al. | 348/396 |
| 5,146,324 | 9/1992 | Miller et al. | 348/405 |
| 5,150,208 | 9/1992 | Otaka et al. | 348/420 |
| 5,719,643 | 2/1998 | Nakajima | 348/700 |
| 5,905,819 | 5/1999 | Daly | 382/284 |
| 5,930,398 | 7/1999 | Watney | 382/239 |

FOREIGN PATENT DOCUMENTS

2063972A1  10/1992  Canada ............... H04N 7/12

*Primary Examiner*—Thomas D. Lee
*Assistant Examiner*—Wenpeng Chen

[57] ABSTRACT

A system extracts, from uncoded video data, coding parameters that correspond substantially to coding parameters used in a coding operation that was previously performed on the video data. The system generates a histogram for at least one AC frequency band in the uncoded video data and calculates a correlation function for the histogram. A maximum value of the correlation function is then identified, and a coding parameter for the at least one AC frequency band is determined using the maximum value of the correlation function.

13 Claims, 6 Drawing Sheets

SYSTEM FOR EXTRACTING CODING PARAMETERS FROM VIDEO DATA

The invention described herein was developed pursuant to United States Government Contract No. 70N1NB5H1174, which was awarded by the National Institute For Standards And Technology (NIST).

BACKGROUND OF THE INVENTION

1. Field of the Invention

The present invention is directed to a system which extracts, from uncoded video data, coding parameters relating to a previous coding process. The invention has particular utility in multi-generational coding systems, in which the same video data is coded and decoded a plurality of times.

2. Description of the Related Art

Generally speaking, a multi-generational coding system includes encoder/decoder pairs arranged in series relative to transmission media. In operation, each of the encoders is adapted to code uncoded video data and then to transmit that uncoded video data over a transmission medium to a decoder which is adapted to decode the coded video data. These systems are in wide use today, particularly where frequent transmission of video data from one location to another is required, such as in the television industry.

Problems arise in multi-generational coding systems of the foregoing type due to the way in which encoders in these systems code video data. More specifically, in these systems, different encoders code the same video data by recalculating coding parameters for each coding operation. Differences in coding parameters resulting from these calculations cause quantization noise to be introduced into the video data. Eventually, following several generations of coding, sufficient quantization noise is introduced into the video data to cause a marked degradation in video image quality.

One conventional solution to the foregoing problem involves introducing additional data, termed a "mole", into decoded video data. This additional data defines coding parameters to be used for the video data, and is transmitted, along with the video data, between encoders and decoders. Use of a mole, however, has several drawbacks. First, the mole must be invisible, otherwise it would affect the quality of images produced from the video data. Making sure that the mole is invisible can be difficult from a technical standpoint. Second, special hardware may be required to transmit video data having a mole, otherwise the mole may be altered during signal transmission. Finally, hardware modifications may be required to ensure that decoders are capable of detecting the mole and of separating the mole from the video data. For at least these reasons, the mole, and systems like it, have proven an inadequate solution to the above problem associated with multi-generational coding.

Thus, there exists a need for a system which reduces the amount of quantization noise introduced into video data during multiple coding processes, without introducing additional information into the video data itself.

SUMMARY OF THE INVENTION

The present invention addresses the foregoing need by providing a method of extracting, from uncoded video data, parameters which correspond substantially to coding parameters used in a coding operation that was previously performed on the video data. To this end, the invention takes advantage of the fact that in some coding techniques, such as Motion Picture Experts Group (hereinafter "MPEG") coding, coding parameters from a previous coding operation are evident based on the uncoded video data. Specifically, the invention performs a series of processes on AC frequency bands in the video data in order to extract these coding parameters from the uncoded video data.

More specifically, according to one aspect, the present invention is a method, and a corresponding apparatus, which extracts coding parameters from uncoded video data, where the coding parameters correspond substantially to coding parameters used in a coding operation that was previously performed on the video data. The method includes generating a histogram for at least one AC frequency band in the uncoded video data and calculating a correlation function for the histogram. A maximum value of the correlation function is identified, whereafter a coding parameter for the at least one AC frequency band is determined using the maximum value of the correlation function.

By taking advantage of coding parameters which are essentially already within the video data, the present invention is able to extract coding parameters relating to a previous coding process without requiring the use of a mole or the like. In this regard, because the invention codes video data using extracted coding parameters, rather than calculated coding parameters, the invention introduces relatively little quantization noise into the video data. Moreover, the invention is more amenable than its conventional counterparts to possible alterations of the decoded video. Furthermore, because the invention can be implemented substantially within software, the need for specially-designed hardware is reduced.

In preferred embodiments of the invention, the step of calculating the correlation function includes identifying a predetermined number of peaks in the histogram of the uncoded video data, and calculating (i) a standard auto-correlation function for the histogram in a case that the number of peaks is less than or equal to a predetermined value, where the standard auto-correlation function is performed for all identified peaks, and (ii) a modified auto-correlation function for the histogram in a case that the number of peaks is greater than the predetermined value, where the modified auto-correlation function is performed for less than all of the identified peaks. By calculating a modified auto-correlation function when the number of peaks is greater than the predetermined value, the invention is able to reduce calculation time without substantially reducing accuracy.

In the invention, the maximum value of the correlation function corresponds to a differentiated dominant reconstruction level ("DDRL") of the at least one AC frequency band. Thus, in other preferred embodiments of the invention, the identifying step comprises determining whether the correlation function includes peaks which overlap and, in a case that peaks overlap, examining additional values of the correlation function in order to determine the DDRL. By virtue of this feature, the invention is able to reduce errors in the determination of the DDRL which result from overlapping peaks in the histogram.

Similarly, another embodiment of the invention reduces errors in the DDRL by comparing first and second peaks of the correlation function to determine which of the first and second peaks is larger and which is smaller, and determining whether the larger peak is a harmonic of the smaller peak. In a case that the larger peak is a harmonic of the smaller peak, the smaller peak is set as the maximum value; however, in a case that the larger peak is not a harmonic of the smaller peak, the larger peak is set as the maximum value.

In still another preferred embodiment of the invention, the DDRL is determined based on an average of distances between dominant reconstruction levels in the histogram. This reduces errors in the DDRL which may result from differences in distances between different dominant reconstruction levels.

According to another aspect, the present invention is a method and corresponding apparatus, for use in a multi-generational coding system, of coding uncoded video data. The method first determines whether the uncoded video data has been subjected to a coding operation in a previous generation of the multi-generational coding system. In a case that the method determines that the uncoded video data has not been subjected to a coding operation, the method codes the uncoded video data using predetermined coding parameters. On the other hand, in a case that the method determines that the uncoded video data has been subjected to a coding operation, the method extracts coding parameters from the uncoded video data and codes the video data using the extracted coding parameters.

By determining whether the uncoded video data has been subjected to a coding operation in a previous generation of the multi-generational coding system, and then proceeding accordingly based on this determination, the present invention is able accurately to process both video data which has not previously been coded and video data which has previously been coded.

According to still another aspect, the present invention is a multi-generational coding system which includes first and second coding means. The first coding means codes original video data using predetermined coding parameters so as to produce coded video data, decodes the coded video data, and outputs uncoded video data. The second coding means receives the uncoded video data from the first coding means, determines that the uncoded video data has been subjected to a previous coding operation, and extracts coding parameters from the uncoded video data. In this aspect of the invention, the coding parameters extracted by the second coding means correspond substantially to the predetermined coding parameters used by the first coding means.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
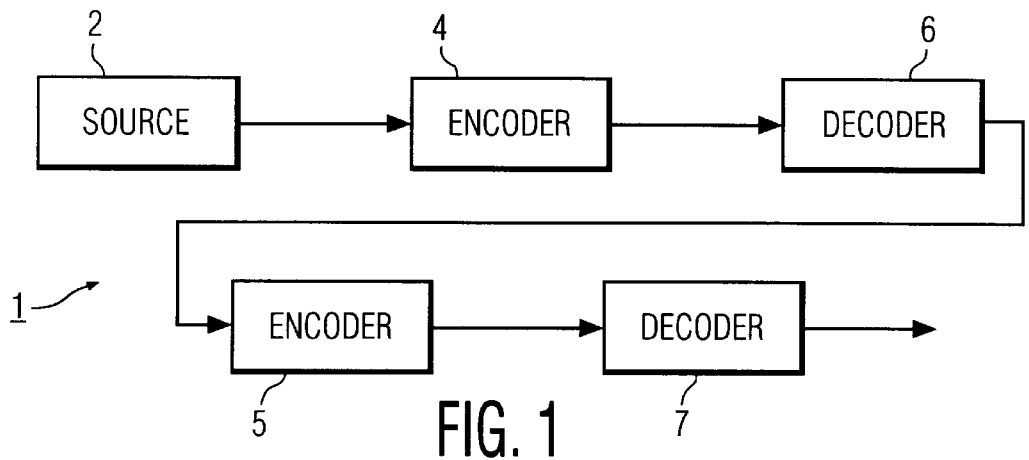
FIG. 1 is a block diagram showing a multi-generational coding system in which the present invention may be implemented.

The preferred embodiments of the invention are described herein with respect to a multi-generational codings system, namely coding system 1 shown in FIG. 1, in which video data is coded using MPEG2. It should be noted, however, that other coding techniques, such as JPEG or the like, may be used in place of MPEG2. Moreover, it is further noted that the invention may be implemented outside the context of a multi-generational coding system.

As background, MPEG2 coding is performed on an image by dividing the image into macro-blocks of 16×16 pixels, each having a separate quantizer scale value (hereinafter "$q_m$") associated therewith. The macro-blocks are then divided into individual blocks of 8×8 pixels. These 8×8 pixel blocks are each subjected to a discrete cosine transform (hereinafter "DCT") which generates DCT coefficients for each of the 64 frequency bands (i.e., pixels) therein. DCT coefficients in an 8×8 pixel block are then divided by a corresponding coding parameter, namely a quantization weight. Thereafter, additional calculations are effected on the DCT coefficients in order to take into account $q_m$ among other things, and thereby complete MPEG2 coding.

In MPEG2, the quantization weights for a particular 8×8 pixel block are expressed in terms of an 8×8 quantization matrix. The invention described herein is concerned with extracting these quantization matrices from video data which has previously been subjected to a coding operation. As described in more detail below, this is possible, particularly in the case of MPEG2, because coding parameters, such as the quantization matrices noted above, can be determined based on reconstruction levels of DCT coefficients in uncoded video data.

Returning to FIG. 1, coding system 1 includes video source 2, encoders 4 and 5, decoders 6 and 7, and various transmission media (not shown) between the video source, encoders, and decoders. Signal processors (not shown) for performing image editing, display, etc. may also be included at different points in the system, such as between decoder 6 and encoder 5. For simplicity's sake, however, these signal processors are omitted therefrom.

Figure 2:
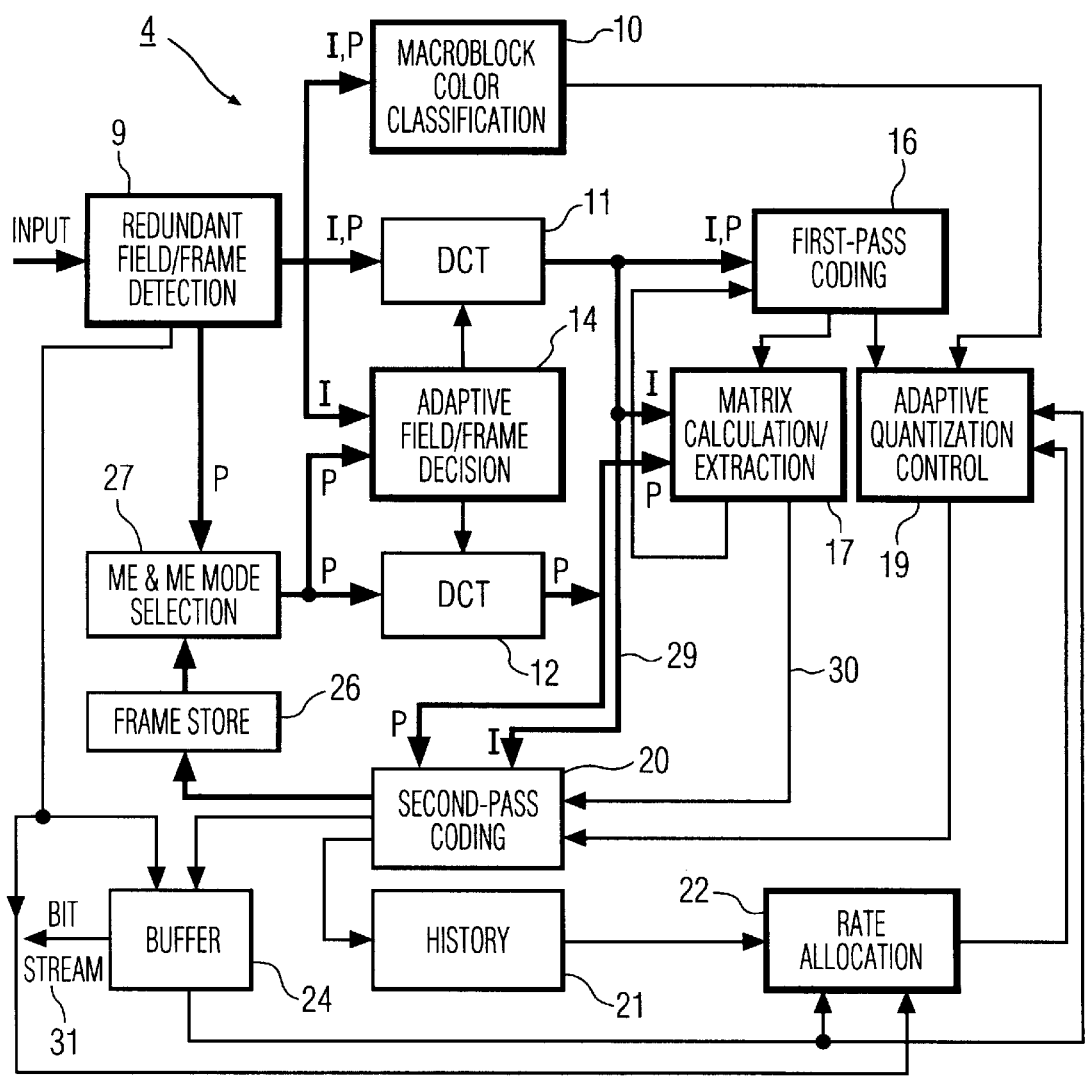
FIG. 2 is a block diagram of an encoder in accordance with the present invention.

Decoders 6 and 7 can comprise any conventional decoder capable of receiving MPEG2-coded video data and of decoding the coded video data. Likewise, source 2 can comprise any type of apparatus, such as a television camera or related video equipment, which is capable of generating video data based on an original image. Encoders 4 and 5, which are identical in both structure and function, include the present invention. A functional block diagram of encoder 4 is shown in FIG. 2. From a hardware standpoint, functions of the blocks shown in FIG. 2, and in particular the blocks comprising the present invention, can be implemented primarily in software using one or more microprocessors which execute process steps stored in a memory.

As shown in FIG. 2, encoder 4 includes redundant field/frame detection block 9, macro-block color classification block 10, DCT blocks 11 and 12, adaptive field/frame decision block 14, first pass coding block 16, matrix calculation/extraction block 17, adaptive quantization control block 19, second pass coding block 20, history block 21, rate allocation block 22, buffer 24, frame store 26, and motion estimation (hereinafter "ME") & ME mode selection block 27. Bold lines in FIG. 2, such as line 29, indicate flow of video data, whereas narrow lines, such as line 30, indicate flow of control data or a final output bit stream. Although the present invention is implemented primarily in matrix calculation/extraction block 17, a brief description of the operation of the remaining elements of encoder 4 is provided herein for the sake of completeness.

More specifically, in operation, video data is received from an external source (e.g., via a local area network or the like) by redundant field/frame detection block 9. Redundant field/frame detection block 9 detects redundant fields in the input video data, which may be present due to conversion between motion picture video and television video, and flags these redundant fields to indicate that they should not be coded. Encoder 4 also includes a decision block (not shown), which may comprise part of redundant field/frame detection block 9, which determines whether video data represents an intra picture (i.e. "I"), meaning that each frame thereof is coded independently, or a predictive picture (i.e., "P"), meaning that each from thereof is coded based on other frames using motion estimation or the like. While the present invention is intended for use with intra pictures, the invention is not necessarily limited to such use. In this regard, it is noted that reduction in quantization noise of intra pictures in accordance with the present invention also has the effect of improving the quality of non-intra pictures, since non-intra pictures base their motion estimation on these intra pictures.

Returning to FIG. 2, macro-block color classification block 10 classifies macro-blocks of video data based on texture and composition and transmits relevant information to adaptive quantization control block 19, described below. ME & ME mode selection block 27 performs motion estimation for non-intra picture input video data based on the input video data and a previous frame of video data stored in frame store 26. Adaptive field/frame decision block 14 determines whether to perform field or frame DCT on the input video data and selects the appropriate one of DCT blocks 11 and 12 to perform the appropriate type of DCT on the video data. First pass coding block 16 gathers information relating to coding the video data and passes this information along to adaptive quantization control block 19 and to matrix calculation/extraction block 17.

As noted above, matrix calculation/extraction block 17 substantially implements the present invention. That is, matrix calculation/extraction block 17 determines if input uncoded video data has been previously coded. In a case that the video data has been previously coded, for each AC frequency band in each 8×8 pixel block in the video data, matrix calculation/extraction block 17 generates a histogram, calculates a correlation function for the histogram, identifies a maximum value of the correlation function, and determines a quantization weight using the maximum value of the correlation function. The extracted quantization weights are then passed to second pass coding block 20. A more detailed description of the operation of matrix calculation/extraction block 17 is set forth in detail below.

Rate allocation block 22 determines a remaining number of available bits in the encoder's bit budget, and passes this information along to adaptive quantization control block 19. Adaptive quantization control block 19 determines how various sections of the video data should be coded based on information from rate allocation block 22, macro-block color classification block 10, first pass coding block 16, and redundant field/frame detection block 9. Second pass coding block 20 receives information from adaptive quantization control block 19, and codes the video data based on this information and based on the quantization weights provided from matrix calculation/extraction block 17. Thereafter, the coded video data is buffered in buffer 24, and output from encoder 4 as bit stream 31.

Figure 3:
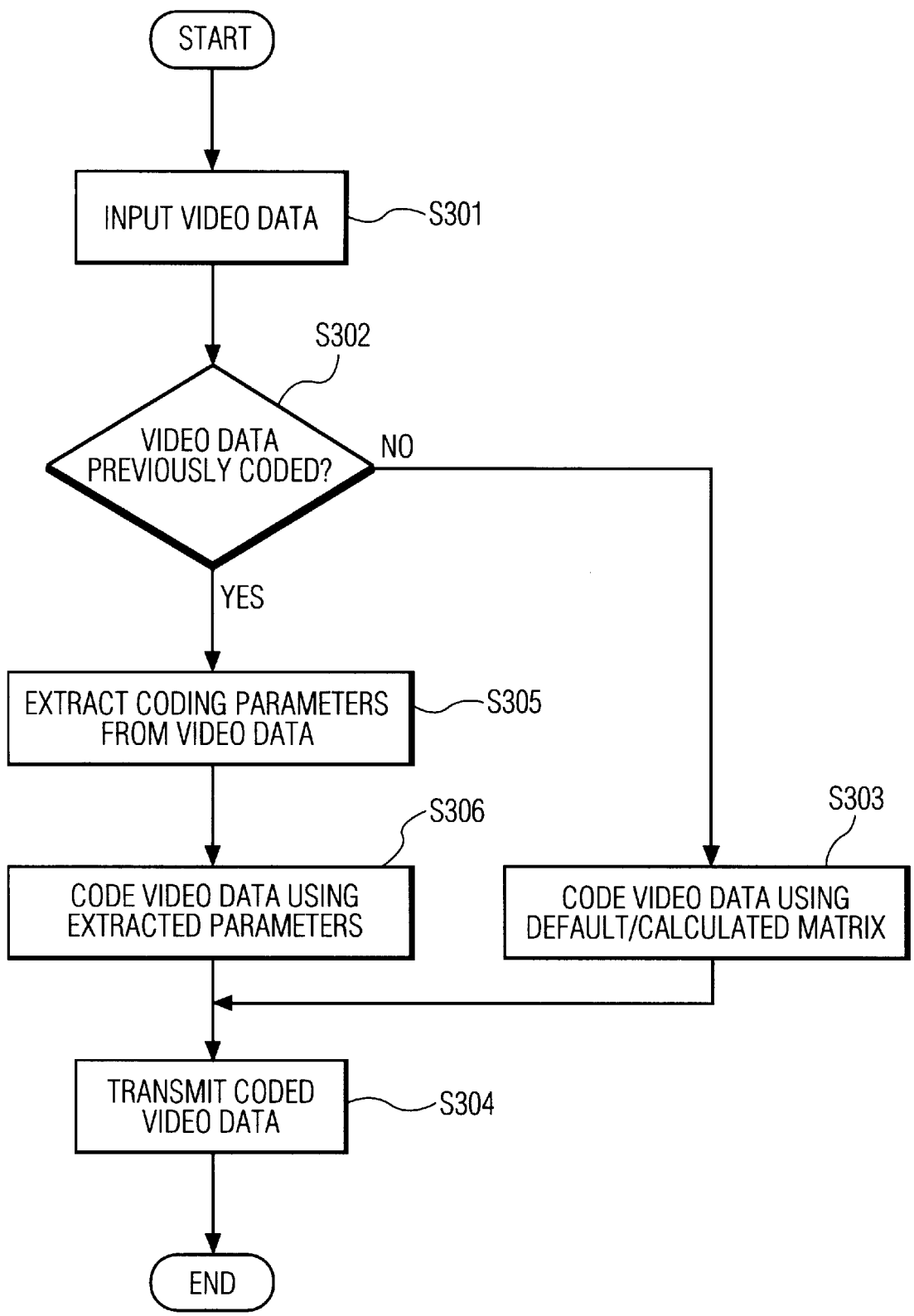
FIG. 3 is a flow diagram showing a coding process in accordance with the present invention.

FIG. 3 is a flow diagram depicting coding of the video data in accordance with the present invention. Specifically, with reference to FIG. 1, in step S301 uncoded video data for an image is input into encoder 4 from source 2. As described above with respect to FIG. 2, the uncoded video data is subjected to DCT processing in order to generate DCT coefficients for AC frequency bands in the video data, whereafter the video data is transmitted to matrix calculation/extraction block 17. There, step S302 determines whether the uncoded video data has previously been subjected to a coding operation. In terms of this disclosure, video data which has not previously been subjected to a coding operation comprises both video data captured directly from an original image and video data which has previously been "lightly coded", meaning that the effects of such "light coding" were so slight as to introduce little or no quantization noise into the video data.

To determine whether the video data has previously been subjected to a coding operation, step S302 examines the first AC frequency band in the image represented by the video data. Specifically, step S302 generates a histogram of DCT coefficients for the (0,1)th AC frequency band. The histogram is generated as follows:

$$H_{0,1}^v = \sum_{|C_{0,1}|=v} 1, \tag{Eq. 1}$$

where "H" corresponds to the histogram, "C" corresponds to a DCT coefficient in the AC frequency band, and "v" takes on values between 0 and 2048, these values corresponding to possible values of the (0,1)th frequency band. Thereafter, the histogram is examined by performing an auto-correlation function thereon. Specifically, the auto-correlation function $R_{0,1}^d$ of $H_{0,1}^v$ is determined as follows:

$$R_{0,1}^d = \sum_{v=0}^{max_{0,1}} H_{0,1}^v H_{0,1}^{v+d}, \tag{Eq. 2}$$

where "d" takes on values between 0 and 2048, these values corresponding to possible values of the (0,1)th frequency band, and where $max_{0,1}$ refers to a highest possible value of the (0,1)th frequency band. Once $R_{0,1}^d$ is found for all "d's", step S302 determines the location of the maximum value of $R_{0,1}^d$, namely $D_{0,1}$, as follows:

$$D_{0,1} = \text{argmax } R_{0,1}^d \; d \neq 0, \tag{Eq. 3}$$

where $D_{0,1}$ corresponds to a distance between reconstruction levels of the (0,1)th AC frequency band. In this regard, reconstruction levels represent reconstructed quantized DCT coefficients for the (0,1)th AC frequency band.

It has been determined experimentally that if $D_{0,1}$ has a value which is less than or equal to 4, video data for the image has not previously been subjected to a coding operation, i.e., the video data comprises either data captured from an original image or has been "lightly coded". Using this information, step S302 examines $D_{0,1}$ in order to determine whether to proceed to step S303 or step S305.

In a case that step S302 determines that the video data has not previously been subjected to a coding operation, processing proceeds to step S303. Step S303 codes the video data using a either a pre-stored, default quantization matrix or a calculated quantization matrix. The default quantization matrix may be stored in a memory of the encoder at the time of its manufacture, or may be obtained from an external source. The calculated quantization matrix may be calculated in accordance with a known matrix calculation method, such as that described in co-pending U.S. patent application Ser. No. 08/991,521, entitled "Method Of Frame-By-Frame Calculation Of Quantization Matrices", filed on Dec. 16, 1997 (Assignee Ref. No.: PHA 23,321), the contents of which are hereby incorporated by reference into the subject application as if set forth herein in full. In any event, following coding using, e.g., the default matrix, processing proceeds to step S304, in which the coded video data is transmitted as a bit stream.

On the other hand, if step S302 determines that the video data has previously been subjected to a coding operation, processing proceeds to step S305. Step S305 extracts, from the video data, quantization matrices that correspond to those used in a previous coding operation. This is possible in MPEG2 because coding parameters, such as the quantization matrices noted above, can be determined based on reconstruction levels of DCT coefficients of uncoded video data. Specifically, quantized DCT coefficients in the uncoded video data correspond to a set of reconstruction levels which are determined based on quantization weights from a previous coding operation. For each frequency band, these reconstruction levels cluster around a series of dominant reconstruction levels. Thus, the quantized DCT coefficients also cluster around those dominant reconstruction levels. By analyzing clustering structures of the quantized DCT coefficients, it is possible to recover the quantization weights from the previous coding operation, together with other quantization parameters, if desired. These recovered quantization weights can then be used to code the video data with lower additional quantization noise than if the video data were coded using calculated quantization weights.

Figure 4:
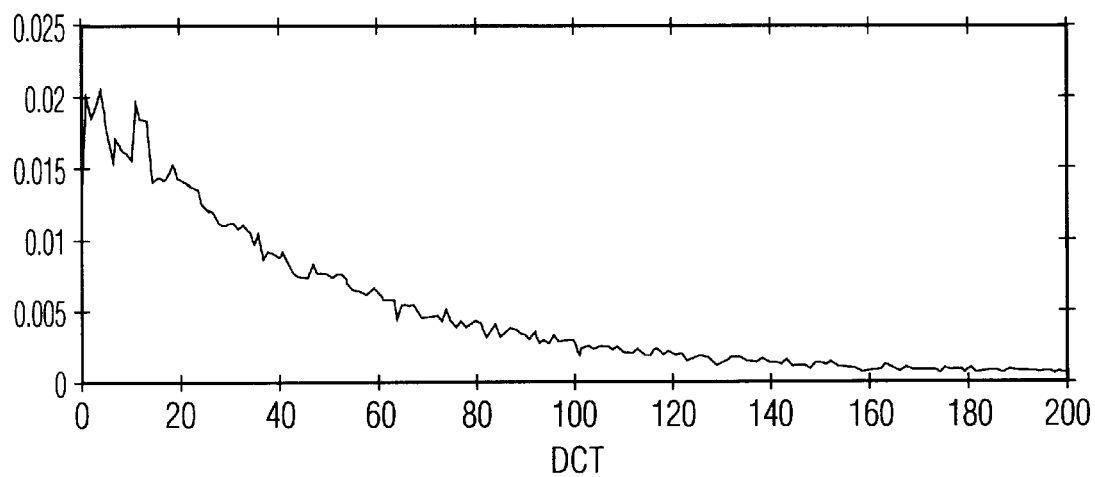
FIG. 4 shows a histogram of DCT coefficients for an AC frequency band of original video data which has not been subjected to a coding operation.
Figure 5:
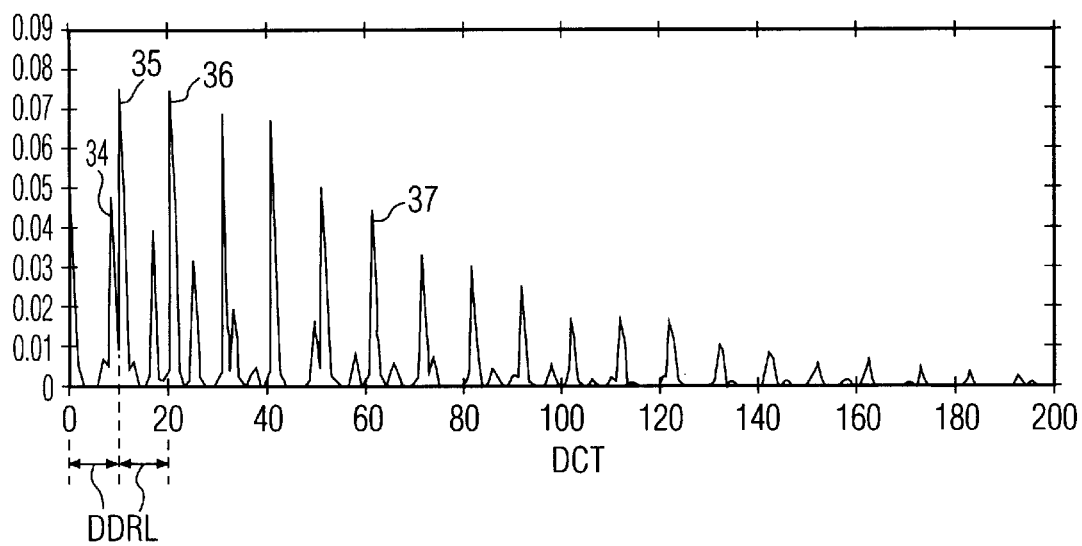
FIG. 5 shows a histogram of DCT coefficients for an AC frequency band of video data which has previously been subjected to a coding operation.

FIG. 4 shows a histogram of DCT coefficients for an AC frequency band of an image which has not been coded. FIG. 5 shows a histogram of that same AC frequency band, in which the video data has previously been coded. As shown in FIG. 5, the histogram for the previously-coded video data shows a series of spikes, examples of which are labeled, 34, 35, and 36. These spikes correspond to reconstruction levels for DCT coefficients of the AC frequency band under examination. It is the spacing between these spikes that contains information relating to the quantization weight which was previously used to code that AC frequency band.

More specifically, in MPEG 2, locations of reconstruction levels (hereinafter "RLs") of an AC frequency band are determined based on a quantization weight used in a previous coding operation, together with a related quantizer scale value. Thus, locations of RLs for a (k,l)th frequency band of an 8×8 pixel block in an (m)th macro-block are determined as follows:

$$RL_{k,l}^i = i * \frac{W_{k,l} q_m}{16}, \quad \text{(Eq. 4)}$$

where $W_{k,l}$ comprises a (k,l)th entry in a quantization matrix corresponding to the 8×8 pixel block, $q_m$ comprises the quantizer scale value for the (m)th macro-block (see above), and "i", which can take on values of 0, ±1, ±2, . . . , comprises an index value of each reconstruction level.

Values of $q_m$ may vary for different macro-blocks of an image being coded. However, due to the way in which MPEG2 coding is performed, namely the type of adaptive quantization used during coding, $q_m$ generally varies around a dominant value Q. Locations of these dominant reconstruction levels (hereinafter "DRLs") for the (k,l)th frequency band can be determined as follows $$DRL_{k,l}^i = i * \frac{W_{k,l} Q}{16}. \quad \text{(Eq. 5)}$$

Examples of DRLs are labeled 35, 36 and 37 in the histogram of FIG. 5.

A differentiated dominant reconstruction level (hereinafter "DDRL") corresponds to the distance between adjacent DRLs, as shown in FIG. 5. Since distances between adjacent DRLs do not depend on index value "i", the DDRL for DCT coefficients in the (k,l)th frequency band is simply determined by removing "i" from equation 5, as follows:

$$DDRL_{k,l} = \frac{W_{k,l} Q}{16}. \quad \text{(Eq. 6)}$$

Thus, the quantization weight $W_{k,l}$ for DCT coefficients in the (k,l)th frequency band can be determined simply by solving for $W_{k,l}$, as follows:

$$W_{k,l} = \frac{16 DDRL_{k,l}}{Q}. \quad \text{(Eq. 7)}$$

Therefore, in order to determine $W_{k,l}$, it is necessary to determine $DDRL_{k,l}$ and Q. Values of these variables are determined as follows.

With regard to Q, MPEG2 coding accuracy relies upon relative, and not absolute quantization weights in a quantization matrix. Accordingly, it is only necessary to determine the relative magnitudes of quantization weights $W_{k,l}$. Therefore, an arbitrary value, in this case 16, can be set as the quantization weight for the (0,1)th AC frequency band $W_{0,1}$. Accordingly, substituting 16 for $W_{0,1}$ in the following equation $$DDRL_{0,1} = \frac{W_{0,1} Q}{16} \quad \text{(Eq. 8)}$$

yields $$Q = DDRL_{0,1}. \quad \text{(Eq. 9)}$$

Since Q can be expressed in terms of a DDRL, the problem of extracting quantization matrices reduces to finding DDRLs for DCT coefficients of corresponding AC frequency bands. As will become clear below, this process includes steps which are similar to those described above for finding $D_{0,1}$.

Figures 6, 7:
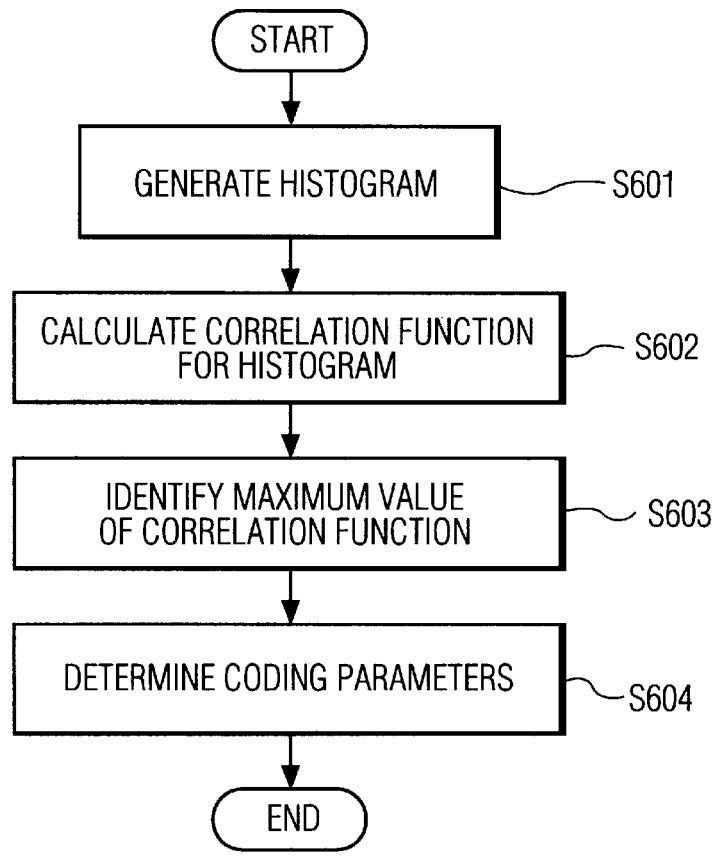
FIG. 6 shows a flow diagram of a quantization matrix extraction process in accordance with the present invention.
FIG. 7 shows a comparison between values of a quantization matrix extracted in accordance with the present invention and values of a default quantization matrix.

Referring to FIG. 6, in step S601 process steps are executed to generate a histogram for DCT coefficients in the (k,l)th AC frequency band in the input video data. This histogram is generated as follows:

$$H_{k,l}^v = \sum_{|c_{k,l}|=v} 1, \quad \text{(Eq. 10)}$$

where the variables are as defined above.

Next, in step S602, process steps are executed to calculate an auto-correlation function for $H_{k,l}^v$. Step S602 may calculate the standard auto-correlation function for the (k,l)th frequency band, which is:

$$R_{k,l}^d = \sum_{v=0}^{\max_{k,l}} H_{k,l}^v H_{k,l}^{v+d}, \qquad \text{(Eq. 11)}$$

where the variables are as defined above.

In preferred embodiments of the invention, however, step S602 executes either the standard auto-correlation function or a modified auto-correlation function. The modified correlation function performs correlation on less than all peaks in the histogram. Which function is used depends upon the number of peaks in the histogram of the DCT coefficients of the (k,l)th frequency band. That is, in these embodiments of the invention, the number of peaks in the histogram is determined, and if the number of peaks is less than or equal to an arbitrary pre-set value, the standard auto-correlation function (defined above) is performed for the histogram. In contrast, if the number of peaks is greater than the pre-set value, then the modified auto-correlation function is performed for the histogram. This feature of the invention is particularly useful in computing systems having limited capacity, since it reduces the amount of calculations required by reducing the number of peaks for which the auto-correlation function is calculated.

In a particularly preferred embodiment of the invention, step S602 generates either the standard auto-correlation function or the modified auto-correlation function using values which are different from "v" and "d" above. In this embodiment, the histogram is generated in step S601 for values of "v" ranging from 0 to 511. Next, $\max_{k,l}$ is found based on the histogram. Variable TP is assigned to the minimum of 10 and $\max_{k,l}$. The maximum histogram y-axis values are then found for the variable TP and their corresponding x-axis values stored in $V_i^H|_{i=1}^{TP-1}$. Thereafter, the auto-correlation function in step S602 is computed for $V_i^H$ for i=0 to TP-1, as follows:

(1) if $V_i^H \leq 4$, then $$R_{k,l} = \sum_{j=0}^{\max_{k,l}/V_i^H - 1} H_{k,l}^{jV_i^H} H_{k,l}^{(j+1)V_i^H}, \text{ but} \qquad \text{(Eq. 12)}$$

(2) if $V_i^H > 4$, then $$R_{k,l} = \sum_{j=0}^{\max_{k,l}/V_i^H - 1} H_{k,l}^{jV_i^H} \max\left(H_{k,l}^{jV_i^H - 1}, H_{k,l}^{jV_i^H}, H_{k,l}^{jV_i^H + 1}\right), \qquad \text{(Eq. 13)}$$

where the variables are as defined above.

Returning to FIG. 6, once step S602 calculates an auto-correlation function for the histogram generated in step S601, the maximum value of the auto-correlation function, $R_{k,l}$, is identified in step S603. The location of this maximum value of $R_{k,l}$ is set as the DDRL for the (k,l)th AC frequency band. Specifically, $$DDRL_{k,l} = \text{argmax } R_{k,l}^d \ d \neq 0, \qquad \text{(Eq. 14)}$$

where the variables are as defined above. For example, in FIG. 5, peak 35 corresponds to the maximum value $R_{k,l}$ of the histogram shown therein. Thus, the DDRL comprises the distance between "0" and the location of peak 35.

In preferred embodiments of the invention, if two peaks in the histogram are within a predetermined distance of each other, e.g., they are relatively close to each other, an average value of the locations of the peaks is determined, and the DDRL is set to this average value. This feature of the invention reduces the likelihood of errors in the DDRL. In addition, several other corrections also may be performed in order to reduce errors in the DDRL.

Specifically, in order to correct for the presence of overlapping peaks in reconstruction levels of the histogram, the invention examines additional maximum values of the correlation function. That is, if peak overlap occurs, the auto-correlation function of the histogram may give larger values at lower lags than at higher lags. Consequently, the true DDRL may not correspond to the largest histogram value, but may correspond to the second largest value, the third largest value, etc. In these cases, the overlapping peaks are disregarded, and additional values of the correlation function are examined in order to determine which value corresponds to the DDRL.

Other errors may occur in determining the DDRL due to the harmonics of the base DDRL. This can cause a quantization weight to be extracted which is a multiple of the real quantization weight. To correct for potential errors of this type, first and second peaks of the correlation function are compared to determine which of the first and second peaks is larger and which is smaller. It is then determined whether the larger peak is a harmonic of the smaller peak. In a case that the larger peak is a harmonic of the smaller peak, the smaller peak is set as the maximum value, i.e., the DDRL, and in a case that larger peak is not a harmonic of the smaller peak, the larger peak is set as the maximum value.

Also, since the distances between different peaks in a histogram may not be identical, the invention takes an average of these distances in order to find the most accurate DDRL for the DCT coefficients of the (k,l)th frequency band.

Once $DDRL_{k,l}$ has been determined, processing proceeds to step S604. In step S604 the quantization weight, $W_{k,l}$, for the (k,l)th AC frequency band is determined by substituting $DDRL_{k,l}$ found in equation 14, and Q (i.e., $DDRL_{0,1}$) found in equation 9, into equation 7. This is done for all (k,l) frequency bands in an 8×8 pixel block, thereby yielding the quantization matrix therefor. FIG. 7 shows a comparison of quantization weights extracted in accordance with the present invention to quantization weights from a default matrix used to code original video data. As is clear from FIG. 7, there is substantial correspondence between the extracted quantization weights and the default quantization weights.

Following step S604, processing proceeds to step S306 of FIG. 3. In step S306, the video data is coded (in second pass coding block 20) using a quantization matrix extracted in accordance with the invention, whereafter the coded video data is output by the encoder in step S304.

Figure 8A:
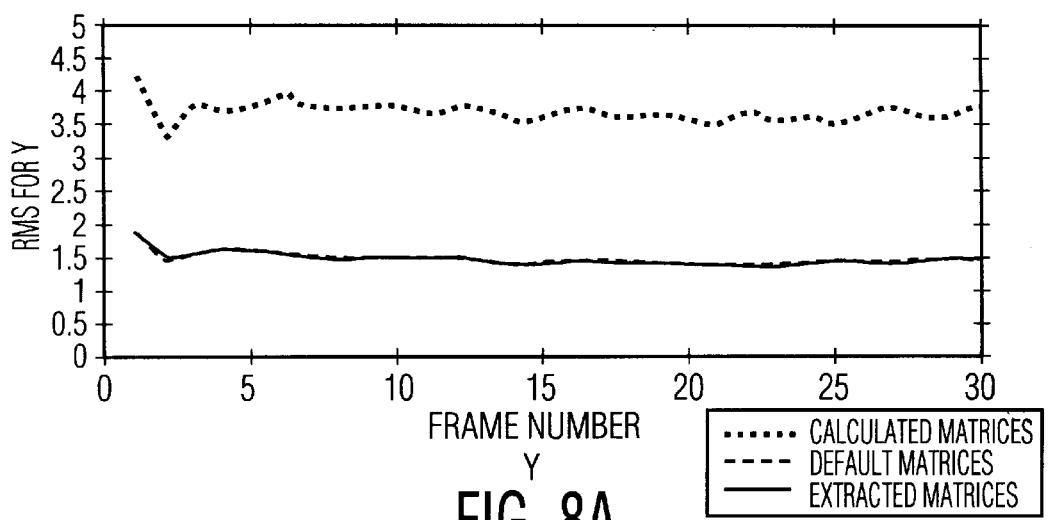
FIGS. 8A to 8C show a first set of simulation results comparing operation of matrix extraction in accordance with the present invention to conventional matrix calculation.
Figure 8B:
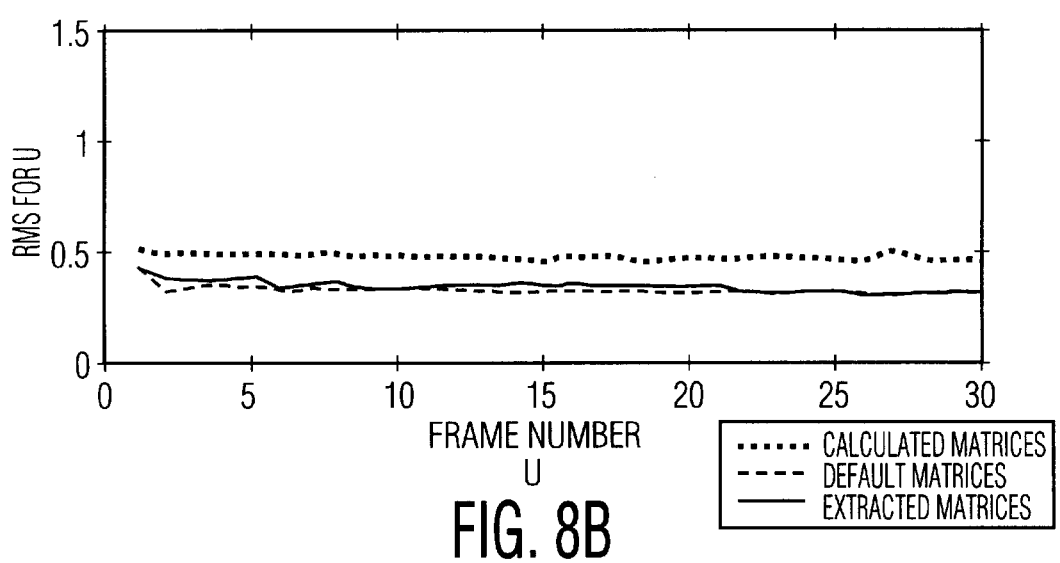
Figure 8C:
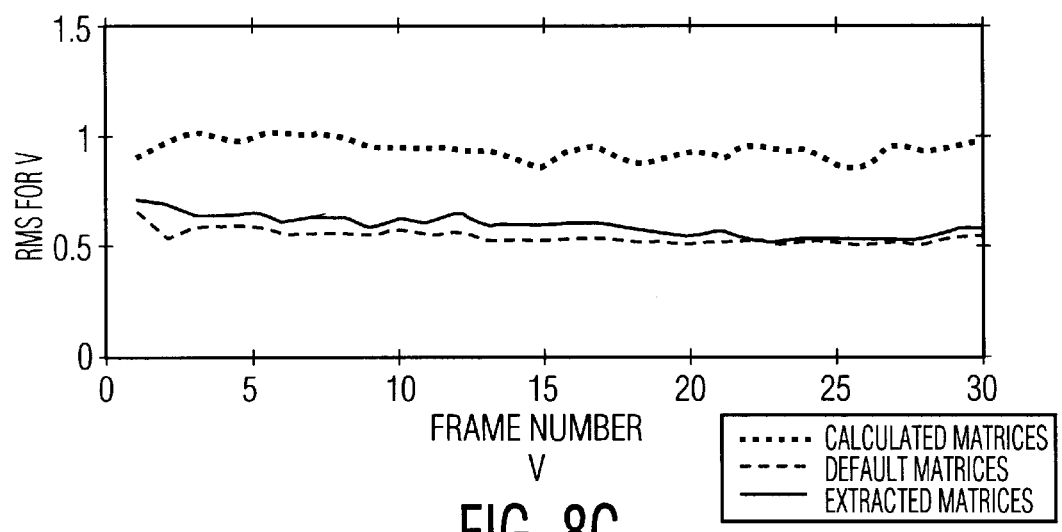
Figure 9A:
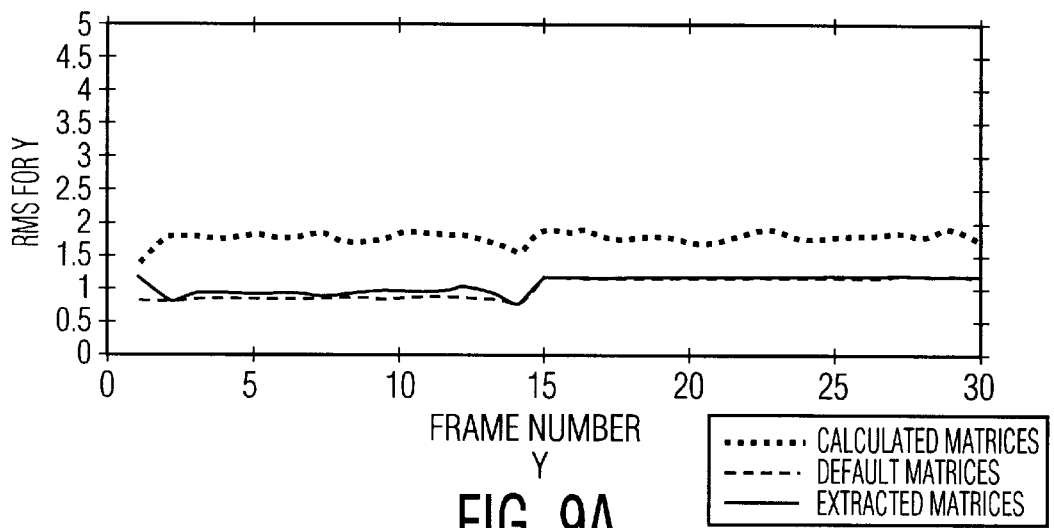
FIGS. 9A to 9C show a second set of simulation results comparing operation of matrix extraction in accordance with the present invention to conventional matrix calculation.
Figure 9B:
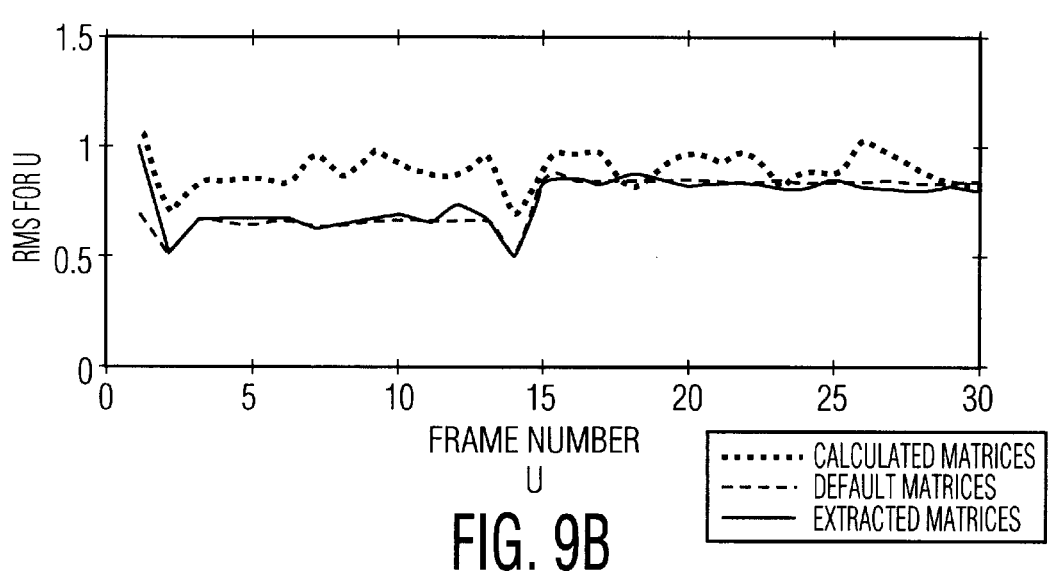
Figure 9C:
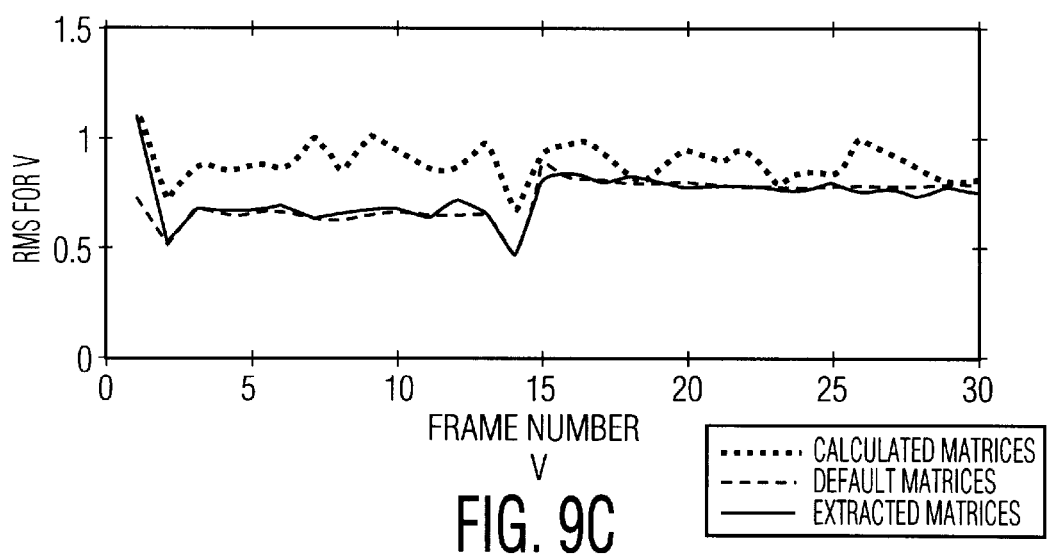

FIGS. 8A to 8C show the results of simulations comparing luminance (Y) signals and chroma (U,V) signals generated using default matrix values to luminance and chroma signals generated using matrices extracted in accordance with the present invention and to luminance and chroma signals generated using matrices calculated in accordance with conventional methods. As is clear from the figures, the luminance and chroma signals generated using matrices extracted in accordance with the present invention are closer to those generated using default matrices than are the luminance and chroma signals generated using matrices calculated in accordance with conventional methods. FIGS.

9A to 9C show results of another simulation confirming the results of FIGS. 8A to 8C.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A method of extracting coding parameters from uncoded video data, where the coding parameters correspond substantially to coding parameters used in a coding operation that was previously performed on the video data, the method comprising the steps of:

generating a histogram for at least one AC frequency band in the uncoded video data;

calculating a correlation function for the histogram;

identifying a maximum value of the correlation function; and determining a coding parameter for the at least one AC frequency band using the maximum value of the correlation function:

wherein the step of calculating the correlation function includes:

identifying a predetermined number of peaks in the histogram of the uncoded video data; and calculating (i) a standard auto-correlation function for the histogram in a case that the number of peaks is less than or equal to a predetermined value, where the standard auto-correlation function is performed for all identified peaks, and (ii) a modified auto-correlation function for the histogram in a case that the number of peaks is greater than the predetermined value, where the modified auto-correlation function is performed for less than all of the identified peaks.

2. A method according to claim 1, wherein the standard auto-correlation function for a (k,l)th AC frequency band comprises:

$$R_{k,l} = \sum_{j=0}^{max_{k,l}/V_i^H - 1} H_{k,l}^{jV_i^H} H_{k,l}^{(j+1)V_i^H},$$

wherein the modified auto-correlation function for the (k,l)th frequency band comprises:

$$R_{k,l} = \sum_{j=0}^{max_{k,l}/V_i^H - 1} H_{k,l}^{jV_i^H} \max\left(H_{k,l}^{jV_i^H - 1}, H_{k,l}^{jV_i^H}, H_{k,l}^{jV_i^H + 1}\right),$$

where $R_{k,l}$ is a value of the auto correlation function for a (k,l)th AC frequency band, $H_{k,l}$ corresponds to histogram values for the frequency band, $max_{k,l}$ is a maximum value of a coefficient for the (k,l)th AC frequency band, and $V_i^H$ corresponds to a peak value of the histogram.

3. A method according to claim 1, further comprising the step of performing a discrete cosine transform (DCT) on the at least one frequency band prior to the generating step.

4. A method of extracting coding parameters from uncoded video data, where the coding parameters correspond substantially to coding parameters used in a coding operation that was previously performed on the video data, the method comprising the steps of:

generating a histogram for at least one AC frequency band in the uncoded video data;

calculating a correlation function for the histogram;

identifying a maximum value of the correlation function; and determining a coding parameter for the at least one AC frequency band using the maximum value of the correlation wherein the maximum value of the correlation function corresponds to a differentiated dominant reconstruction level (DDRL) of the at least one AC frequency band such that, in the determining step, a coding parameter, $W_{k,l}$, for a (k,l) the frequency band is determined by solving the following equation:

$$W_{k,l} = \frac{16DDRL[k,l]}{Q},$$

function:

where Q defines an adaptive quantization value of a block of video data which includes the (k,l)th frequency band.

5. A method according to claim 4, wherein the identifying step comprises determining whether peaks in the histogram of the video data overlap and, in a case that peaks overlap, examining additional values of the correlation function in order to determine the DDRL.

6. A method according to claim 4, wherein the identifying step comprises:

comparing first and second peaks of the correlation function to determine which of the first and second peaks is larger and which is smaller; and determining whether the larger peak is a harmonic of the smaller peak;

wherein, (i) in a case that the larger peak is a harmonic of the smaller peak, the smaller peak is set as the maximum value, and (ii) in a case that larger peak is not a harmonic of the smaller peak, the larger peak is set as the maximum value.

7. A method according to claim 4, wherein $DDRL_{k,l}$ comprises an average of distances between reconstruction levels in the histogram of the video data.

8. A coding apparatus which extracts coding parameters from uncoded video data, where the coding parameters correspond substantially to coding parameters used in a coding operation that was previously performed on the video data, the coding apparatus comprising:

a memory which stores computer-executable process steps; and a processor which executes the computer-executable process steps stored in the memory so as (i) to generate a histogram for at least one AC frequency band in the uncoded video data, (ii) to calculate a correlation function for the histogram, (iii) to identify a maximum value of the correlation function, and (iv) to determine a coding parameter for the at least one AC frequency band using the maximum value of the correlation function;

wherein the computer-executable process steps to calculate the correlation function comprise steps to identify a predetermined number of peaks in the histogram of the uncoded video data, and to calculate (i) a standard auto-correlation function for the histogram in a case that the number of peaks is less than or equal to a predetermined value, where the standard auto-correlation function is performed for all identified peaks, and (ii) a modified auto-correlation function for the histogram in a case that the number of peaks is greater than the predetermined value, where the modified auto-correlation function is performed for less than all of the identified peaks.

9. A coding apparatus according to claim 8, wherein the processor executes computer-executable process steps so as to perform a discrete cosine transform (DCT) on the at least one frequency band prior to generating the histogram.

10. A coding apparatus according to claim 8, wherein the maximum value of the correlation function corresponds to a differentiated dominant reconstruction level (DDRL) of the at least one frequency band; and wherein the processor executes process steps to determine the coding parameter based on the DDRL.

11. A coding apparatus according to claim 10, wherein the DDRL comprises an average of distances between reconstruction levels in the histogram of the video data.

12. A coding apparatus which extracts coding parameters from uncoded video data, where the coding parameters correspond substantially to coding parameters used in a coding operation that was previously performed on the video data, the coding apparatus comprising:

a memory which stores computer-executable process steps; and a processor which executes the computer-executable process steps stored in the memory so as (i) to generate a histogram for at least one AC frequency band in the uncoded video data, (ii) to calculate a correlation function for the histogram, (iii) to identify a maximum value of the correlation function, and (iv) to determine a coding parameter for the at least one AC frequency band using the maximum value of the correlation function;

wherein, to identify the maximum value of the correlation function, the processor executes process steps to determine whether peaks in the histogram of the video data overlap and, in a case that peaks overlap, to examine additional values of the correlation function in order to determine a differentiated dominant reconstruction level (DDRL) of the at least one frequency band.

13. A coding apparatus which extracts coding parameters from uncoded video data, where the coding parameters correspond substantially to coding parameters used in a coding operation that was previously performed on the video data, the coding apparatus comprising:

a memory which stores computer-executable process steps; and a processor which executes the computer-executable process steps stored in the memory so as (i) to generate a histogram for at least one AC frequency band in the uncoded video data, (ii) to calculate a correlation function for the histogram, (iii) to identify a maximum value of the correlation function, and (iv) to determine a coding parameter for the at least one AC frequency band using the maximum value of the correlation function;

wherein, to identify the maximum value of the correlation function, the processor executes process steps to compare first and second peaks of the correlation function to determine which of the first and second peaks is larger and which is smaller, and to determine whether the larger peak is a harmonic of the smaller peak; and wherein, (i) in a case that the larger peak is a harmonic of the smaller peak, the smaller peak is set as the maximum value, and (ii) in a case that the larger peak is not a harmonic of the smaller peak, the larger peak is set as the maximum value.

* * * * *